United States Patent [19]

Poenisch

[11] Patent Number: 4,485,074

[45] Date of Patent: Nov. 27, 1984

[54] PROCESS FOR THE RECOVERY OF MOLYBDENUM FROM ORGANIC SOLUTIONS

[75] Inventor: Richard B. Poenisch, Galveston, Tex.

[73] Assignee: Atlantic Richfield Company, Los Angeles, Calif.

[21] Appl. No.: 227,115

[22] Filed: Jan. 21, 1981

[51] Int. Cl.$^3$ .............................................. C01G 39/00
[52] U.S. Cl. ........................................ 423/55; 423/53; 75/108
[58] Field of Search .................................... 423/53–55; 75/108, 121; 252/420

[56] References Cited

U.S. PATENT DOCUMENTS

| | | | |
|---|---|---|---|
| 3,763,303 | 10/1973 | Khuri et al. | 423/54 |
| 3,887,361 | 6/1975 | Lemke | 75/108 |
| 4,046,852 | 9/1977 | Vertes et al. | 423/54 |
| 4,317,802 | 3/1982 | Dugua et al. | 423/53 |

FOREIGN PATENT DOCUMENTS 1317480 5/1973 United Kingdom ................ 423/53

OTHER PUBLICATIONS

Watanabe et al., "Chemical Absts.", vol. 81, 1974, #39646m, pp. 140–141.

*Primary Examiner*—Herbert T. Carter
*Attorney, Agent, or Firm*—Michael S. Jarosz

[57] ABSTRACT

Process for the recovery of molybdenum from an organic solution, such as a spent catalyst solution obtained from the molybdenum catalyzed epoxidation of an olefinically unsaturated organic compound with an organic hydroperoxide as oxidizing agent and removal from the crude epoxidation mixture of product epoxide and the alcohol corresponding to the hydroperoxide, said process comprising:

(a) admixing the organic solution with water in an amount between about 0.5 and 10 percent, based on the weight of the organic solution;

(b) heating the resultant admixture to a temperature in the range of between about 150° C. and 250° C. under pressure sufficient to maintain the admixture in the liquid phase and for a time sufficient to precipitate at least a portion of the molybdenum contained in the organic solution as a solid; and (c) separating the precipitated molybdenum containing solid from the organic solution.

19 Claims, No Drawings

PROCESS FOR THE RECOVERY OF MOLYBDENUM FROM ORGANIC SOLUTIONS

BACKGROUND OF THE INVENTION

Oxirane compounds such as propylene oxide, and higher alkylene oxide homologs are valuable articles of commerce. One of the most attractive processes for synthesis of these oxirane compounds is described by Kollar in U.S. Pat. No. 3,351,635. According to Kollar, the oxirane compound (e.g., propylene oxide) may be prepared by epoxidation of an olefinically unsaturated compound (e.g., propylene) by use of an organic hydroperoxide and a suitable catalyst such as molybdenum. During the epoxidation reaction the organic hydroperoxide is converted almost quantitatively to the corresponding alcohol. That alcohol may be recovered as a coproduct with the oxirane compound.

Kollar teaches that oxirane compounds may be prepared from a wide variety of olefins. Lower olefins having three or four carbon atoms in an aliphatic chain are advantageously epoxided by the process. The class of olefins commonly termed alpha olefins or primary olefins are epoxidized in a particularly efficient manner by the process. It is known to those in the art that primary olefins, e.g., propylene, butene-1, decene-1, hexadecene-1, etc. are much more difficultly epoxidized than other forms of olefins, excluding only ethylene. Other forms of olefins which are much more easily epoxidized are substituted olefins, alkenes with internal unsaturation, cycloalkenes and the like. Kollar teaches that nowithstanding the relative difficulty in epoxidizing primary olefins, epoxidation proceeds more efficiently when molybdenum catalysts are used. Kollar teaches that activity of certain metals, and particularly molybdenum, for epoxidation of the primary olefins is surprisingly high and can lead to high selectivity of propylene to propylene oxide. These high selectivities are obtained at high conversions of hydroperoxide (50% or higher) which conversion levels are important for commercial utilization of the technology. Kollar's epoxidation reaction proceeds under pressure in the liquid state and, accordingly, a liquid solution of the metal catalyst is preferred. Preparation of suitable catalysts is taught in U.S. Pat. Nos. 3,434,975; 3,453,218; and 3,480,563. These catalysts are produced by the reaction of molybdenum metal or molybdenum oxides with an organic hydroperoxide such as tertiary butyl hydroperoxide in the presence of alcohol or with alcohols. Irrespective, however, of the particular molybdenum compound employed as catalyst in these epoxidation reactions, it has been found that the molybdenum forms a high molecular weight, highly complex compound which because of its low volatility, is carried through the process following successive distillation (or other physical separatory procedure) utilized to recover and separate unreacted olefin, the alkylene oxide product and the byproduct alcohol resulting from the reduction of the organic hydroperoxide.

When an olefin is epoxidized with an organic hydroperoxide in the presence of molybdenum containing catalyst according to the Kollar process, a product mixture containing unreacted alkylene oxide, an alcohol corresponding to the organic hydroperoxide and molybdenum catalyst is obtained. Distillation of that product mixture provides substantially pure alkylene oxide and alcohol products. The residue of diltillation (hereafter "bottoms") contains spent molybdenum catalyst, some alcohol, acids as well as high boiling organic residues. Removal and recovery of the molybdenum values from such organic solutions are important from ecological and economical standpoints and have been the subject of a number of previous researchers.

In U.S. Pat. No. 3,763,303, Khuri et al. disclose two embodiments of a process for recovering molybdenum values from spent epoxidation catalysts. The Khuri process first embodiment involves recovery of molybdenum directly from the spent catalyst mixture by a liquid-to-liquid extraction utilizing an aqueous extractant consisting essentially of water which is intermittently admixed with the residue to be treated to effect an extraction and transfer of a portion of the molybdenum constituent from the organic phase to the aqueous phase. According to Khuri et al, untreated spent catalyst solutions containing molybdenum in concentrations of from about 0.1% to about 1.0%, by weight, are highly satisfactory for treatment in the liquid-to-liquid extraction process in which the extractant consists essentially of water to effect molybdenum separation. Molybdenum separated with the aqueous extract is recovered as molybdenum trioxide by evaporation of water followed by calcination of the solid obtained by extract evaporation.

The second embodiment of the Khuri process relates to extracting molybdenum from distillation residues obtained from distillation of spent catalyst solution (bottoms) but the extraction is performed with acids or bases to convert the molybdenum into a recoverable molybdenum compound of the acid or base.

It has also been suggested in Tave U.S. Pat. No. 3,453,068 to recover molybdenum from such organic solutions by heating the solution in a free oxygen-containing gas to from 850° F. to 2000° F. to convert the molybdenum to the oxide which is collected by cooling to a temperature below the sublimation temperature.

Tave U.S. Pat. No. 3,463,604 describes a process in which the molybdenum contained in the organic residual effluent is precipitated by means of an aqueous solution of ammonium phosphate; in this process an aqueous solution containing ammonium phosphate is admixed with the effluent, thereby precipitating an insoluble phosphomolybdate compound. However, this process is incapable of recovering substantially all of the molybdenum contained in the organic residual effluent, thereby rendering the resultant organic solution freed of molybdenum by the process incapable of use as fuel without subjection to further treatment involving use of expensive apparatus.

British Patent Specification No. 1,317,480 also teaches recovery of molybdenum values from spent epoxidation catalysts. As in Khuri, the British recovery process involves extracting the spent catalysts solution with water alone or with aqueous ammonia. The British extraction process results in a transfer of at least 95% of the available molybdenum values to the aqueous extract. Those molybdenum values are recovered from the aqueous phase by precipitation as a phosphomolybdate or by distillative stripping of the volatile organic material and water from the extract.

The spent catalyst solution may also be subjected to exhaustive evaporation or distillation to produce a residue with a higher molybdenum content as taught by Levine et al. in U.S. Pat. No. 3,819,663. The Levine process starts with a spent catalyst solution, such as the aforedescribed bottoms, and subjects that solution to a wiped film evaporation at 375° F. to 450° F. until 60% to 80% by weight of the solution, is evaporated overhead. The residue of that evaporation is taught to be useful in preparation of a catalyst in further epoxidation processes.

Lemke teaches in U.S. Pat. No. 3,887,361 that molybdenum may be precipitated from spent catalyst solutions obtained from the Kollar epoxidation process by adding tertiary-butyl alcohol to the "bottoms" until a level of 5% to 50%, by weight, of tertiary-butyl alcohol is achieved. Then the mixture is heated to 100° C. to 300° C. to effect molybdenum precipitation; according to the patentee, the precipitated molybdenum can then be reused in further epoxidations. However, this process is quite costly in requiring the use of expensive tertiary butyl alcohol and further, due to the varying nature of the spent catalyst solution to be treated, fails to provide consistent results.

SUMMARY OF THE INVENTION

The present invention provides a means for recovering molybdenum from an organic solution containing molybdenum values, such as a spent catalyst solution, i.e. "bottoms", obtained from the molybdenum catalyzed epoxidation of an olefin with a hydroperoxide. The molybdenum is recovered from the organic solution as a solid material which is produced by adding a specified quantity of water to the organic solution, preferably with agitation to prevent formation of distinct organic and aqueous phases, heating the resultant admixture at a specified elevated temperature under pressure to maintain the admixture substantially in the liquid phase for a time sufficient to precipitate at least a portion of the molybdenum contained in the organic solution as a solid, and separating the precipitated molybdenum containing solid from the organic solution.

As used in the present specification and the annexed claims, the term "spent catalyst solution" is intended to mean that fraction of the epoxidation reaction product effluent remaining after removal of unreacted olefin (for example, propylene), alkylene oxide (for example, propylene oxide) and a major portion of the alcohol corresponding to the hydroperoxide (for example, tertiary butyl hydroperoxide) used in the epoxidation reaction which reaction may be according to the procedure of Kollar. Spent catalyst solution, apart from molybdenum containing compounds, contains some alcohol, acids and other low molecular weight oxygenated compounds and said spent catalyst solution is generally not subjected to any chemical treatment before being subjected to the process of the present invention. It is contemplated that spent catalyst solution as used herein includes the distillation bottoms obtained from the Kollar process or which are treated in British Patent Specification No. 1,317,480, as well as the residue obtained from the wiped film evaporation process according to Levine et al. U.S. Pat. No. 3,819,663 the disclosures of which are incorporated herein by reference; spent catalyst solutions thereby obtained may contain molybdenum compounds at levels of up to about 5% by weight, but have generally between about 0.1 percent and 2 percent. Hence, procedures for accomplishing such epoxidations and distillations are well-known in the art.

Accordingly, it is an object of the present invention to provide a simple and speedy process for efficiently recovering molybdenum from organic solutions, and particularly spent catalyst solution, in the form of a solid which is directly suitable for use in preparation of fresh soluble molybdenum epoxidation catalysts.

Another object of this invention is to provide a more efficient and economical method for removal of dissolved molybdenum values from the spent catalyst solutions so that the remaining residue contains minimum quantities of molybdenum.

Still another object of the invention is to provide a process wherein the organic solution containing the molybdenum or spent catalyst solution is substantially freed of molybdenum, rendering the residual organic portion suitable for use or sale as a fuel.

These and other objects of the invention will become apparent from the following description of the invention and the examples.

DETAILED DESCRIPTION OF THE INVENTION

The present invention involves a simple and speedy yet highly effective means for separating organic residues from molybdenum values in organic solutions containing such molybdenum values or in spent catalyst solutions from hydroperoxide oxidations of olefins. By use of the present invention, the level of molybdenum contained in the organic residues is reduced to a very low level which permits disposal of the organic residue by sale for fuel value, use as a fuel or by other conventional means without equipment fouling or pollution of the environment. In the present process, separation of molybdenum-containing solid leaves an organic residue substantially free of molybdenum. Separation of substantially all the molybdenum values from the organic solution or spent catalyst solutions is important for both molybdenum recovery as well as for purification of said organic solution. The organic residue itself is an important commodity which can be sold as a fuel or burned directly as a fuel. However, in order to be useful for fuel purposes, the molybdenum level should be lower than about 250, and preferably lower than about 100 parts per million, molybdenum, in the organic residue. Higher levels of molydenum in the organic residue burned as fuel results in fouling of the furnace burning the fuel and as such, frequent furnace downtime is necessitated for cleaning and repair. Also, higher levels of molybdenum result in objectionable increases in environmental pollution.

Furthermore, this invention provides a means for recovering molybdenum-containing solids which are per se valuable for their molybdenum content and which may be sold for the molybdenum content or used without further processing as the source of molybdenum used in preparation of a soluble molybdenum epoxidation catalyst according to the procedures known in the art.

The molybdenum catalyzed hydroperoxide oxidation (epoxidation) of olefins from which the spent catalyst solution to be treated is obtained is described by Kollar, discussed above. Kollar describes a wide variety of olefins which can be epoxidized by a wide variety of peroxides under the influence of molybdenum catalysts. The present invention is applicable to separating solid molybdenum compounds from the organic residues of spent catalyst solutions obtained from the epoxidation of any of the olefins disclosed by Kollar using any of the peroxides disclosed by Kollar. Thus the present invention has general applicability for separating molybdenum from a wide variety of the organic residue of a spent epoxidation catalyst stream.

Epoxidation of an olefin is suitably accomplished by charging a reactor with the olefin to be oxidized, an organic hydroperoxide and a soluble molybdenum catalyst prepared in accordance with procedures disclosed in the above referenced art. After epoxidation under conditions, for example, as taught by Kollar, product epoxide is removed from the reaction mixture leaving a by-product mixture containing, inter alia, spent catalyst solution and an alcohol corresponding to the hydroperoxide reactant employed. For instance, when tertiary-butyl hydroperoxide is employed in the epoxidation, tertiary-butyl alcohol is formed. The alcohol is removed from the by-product mixture by distillation which leaves, as a residue, an organic solution comprising a spent catalyst solution containing molybdenum values, and higher molecular weight organic residues; such residue may also contain small quantities, i.e. up to about 10 percent, of undistilled alcohol product, as is disclosed in the aforementioned Levine et al. patent.

In general, the improved process of the present invention for the recovery of molybdenum values from an organic solution containing molybdenum, generally present in combined form, such as an organomettalic complex, comprises:

(a) admixing said organic solution with water in a amount of between about 1 and 10 percent, based on the weight of the organic solution;

(b) heating the resultant admixture to a temperature in the range of between about 150° C. and 250° C. under pressure sufficient to maintain said admixture substantially in the liquid phase for a time sufficient to precipitate at least a portion of the molybdenum contained in the organic solution as a solid; and (c) separating the precipitated molybdenum containing solid from the organic solution.

Admixture of the organic solution containing the molybdenum values with water is effected in any convenient manner provided that the amount of water contained in the resultant admixture is controlled to avoid phase separation, i.e. formation of two or more distinct phases. Generally, amounts from about 0.5 percent to about 10 percent, by weight, based on the weight of the organic solution, are suitable, although amounts from about 2.5 percent to about 5 percent are particularly preferred. However, large excesses of water addition should be avoided to preclude phase separation and to avoid production of a wet fuel as the residual product of the reaction, following separation and recovery of the molybdenum containing solid. The water admixed with the organic solution containing molybdenum values may be added from an external source, or alternatively, may be generated in situ, by decomposition of one or more of the constituents which may be present in the organic solution at the reaction conditions of the process.

In accordance with the process of the present invention, it is essential that the organic solution admixed with water be heated to a temperature in the range of between about 150° C. and about 250° C., preferably about 175° C. and 225° C., under a pressure sufficient to maintain the admixture in the liquid phase and for a time sufficient to permit precipitation of at least a portion of the molybdenum contained in the organic solution. Heating of the admixture may be conducted by a batch technique in an autoclave, or by employing either a single reactor or a series of reactors in cascade, or alternatively, may be effected continuously in a reactor maintained at the elevated temperatures specified under pressure sufficient to maintain the admixture in the liquid phase. Generally, pressures from about 100 p.s.i.g. to about 600 p.s.i.g. are required in order to maintain the admixture in the liquid phase at the temperature specified, although pressures from about 300 p.s.i.g. to about 500 p.s.i.g. are preferred. The admixture is maintained at the elevated temperature and pressure specified for a time sufficient to precipitate at least a portion of the molybdenum contained in the organic solution. In general, it is desired to maintain the conditions of temperature and pressure specified for a period sufficient to precipitate at least 90 percent of the molybdenum contained in the organic solution as a molybdenum containing solid. When it is desired to obtain a residual organic solution, i.e. the organic phase remaining following separation of the precipitated molybdenum containing solid, containing less than about 250, and preferably less than about 100 parts per million of molybdenum, the admixture is maintained at the stated elevated temperatures and pressures for a period between about 0.5 and 10 hours, preferably between about 1 and 3 hours. The reactor contents are preferably continuously agitated during the thermal treatment in order to ensure maintenance of the admixture as a homogenuous single liquid phase, thereby precluding phase separation. If desired, the thermal treatment can be carried out in the presence of an inert gas, such as helium, nitrogen or carbon dioxide, or alternatively may be carried out in the presence of a reducing gas such as hydrogen or carbon monoxide.

Thermal treatment under the conditions specified, results in precipitationn of solid molybdenum metal from the admixture. Recovery of the molybdenum values is carried out by any conventional means, such as by filtration, centrifugation, decantation of the residual organic phase, and the like, without need for any further purification. In the event the recovered precipitate is particularly finely divided, a filter aid may be incorporated into the admixture to aid in facilitating precipitation in conventional manner. However, if desired, the recovered molybdenum values may be washed with an alcohol, such as a lower alkanol, illustratively, methyl or ethyl alcohol, prior to its reuse.

The molybdenum containing solid recovered in accordance with the process of this invention is useful as such, or optionally, may be reused in the formation of an active molybdenum catalyst useful for reuse in the epoxidation reaction, for example, as is described in aforementioned prior art, or may be employed, as is well-known in the art, for reaction with an organic acid for the production of catalysts useful in the oxo process for the production of alcohols.

Thus, the present invention provides a safer and faster, one-step economical process for the commercial recovery of molybdenum values from organic solutions, than is currently known to exist.

The following examples will serve to illustrate practice of the invention but are not intended to limit the invention to the details described herein. Parts and percentages are by weight and temperatures are given in degrees Centigrade, unless otherwise specified.

EXAMPLES I–III

Samples of a spent catalyst solution were weighed into a stainless steel reactor along with a measured amount of deionized water. The samples were obtained as the distillation bottoms resulting from the distillation of propylene oxide and tertiary butyl alcohol product produced by reaction of propylene with tertiary butyl hydroperoxide in the presence of a molybdenum containing catalyst as is described in Kollar U.S. Pat. No. 3,351,635; the spent catalyst solution was further evaporated in a wiped film evaporator until about 67%, by weight, of the charge is removed overhead as vapor in accordance with the procedure of Example 4 of Levine et al, U.S. Pat. No. 3,819,663. The reactor, eqipped with an agitator, was then sealed and purged with helium at ambient temperature. With the agitator activated, the reactor was then heated to a predetermined temperature and held thereat for 3 hours; the reactor was then cooled and the sample was removed and filtered for analysis.

In the first Example, one thousand (1,000) parts of the spent catalyst solution containing 0.71 percent molybdenum (7100 p.p.m.) was heated at 186° in the presence of three weight percent of water. The maximum pressure observed was 345 p.s.i.g. After filtration, the treated liquid contained 0.07 percent molybdenum, (700 p.p.m.) corresponding to 90.1 percent removal of molybdenum from the organic effluent into a solid removable phase. The solid phase recovered was a very fine precipitate; analysis of the vapor from the reactor showed a substantial amount of carbon monoxide.

In the second Example, one thousand two hundred (1,200) parts of the spent catalyst solution containing 0.71 percent molybdenum was heated at 186° with five weight percent of water. The final pressure in this run was 410 p.s.i.g. The treated filtrate contained 0.04 (400 p.p.m.) percent molybdenum.

The third Example consisted of heating one thousand two hundred (1,200) parts of organic liquid containing 0.71 percent molybdenum with five weight percent of water at 202°. The final pressure indicated was 555 p.s.i.g. The liquid from this Example was filtered twice to ensure solids removal. Analysis for molybdenum showed 0.006 percent molybdenum (66 p.p.m.) to be contained in this liquid, which corresponds to an elimination of molybdenum from the spent catalyst solution of 99.1 percent.

EXAMPLE IV

A comparative example was carried out employing a spent catalyst solution obtained as described in Examples I-III, above, but containing 0.65 percent molybdenum (6500 p.p.m.). In this example, three percent of water was added to the spent catalyst solution and the admixture was held at the boiling point, 128°, for a period of three hours. The pressure of the reaction was 0 p.s.i.g. The liquid was filtered twice to ensure solids removal. Analysis for molybdenum showed 0.43 percent molybdenum (4300 p.p.m.), which corresponds to a conversion of 33.8 percent.

This example illustrates that desired results of molybdenum recovery are not obtained unless the admixture of spent catalyst solution and water are heated at the temperature and pressure conditions specified.

The present invention has been described and illustrated by reference to specific embodiments thereof, and the examples illustrate a conventional mode of carrying out the invention. It should be noted, however, that variations will be obvious to those skilled in the art in view of the disclosures contained herein.

I claim:

1. A process for the recovery of molybdenum from an organic solution derived from the epoxidation of an olefinically unsaturated containing a soluble molybdenum containing organic compound which comprises:
   (a) admixing said organic solution with water, in an amount between about 0.5 and 10 percent, based on the weight of the organic solution, to form an admixture of the organic solution and water;
   (b) heating said mixture to a temperature in the range of about 150° C. to about 250° C. under pressure sufficient to maintain said admixture in the liquid phase and for a time sufficient to precipitate at least a portion of the molybdenum contained in the organic solution as a solid; and
   (c) separating the precipitated molybdenum containing solids from the organic solution.

2. The process of claim 1 wherein the admixture is maintained substantially as one homogenuous liquid phase.

3. The process of claim 1 wherein the heating of the admixture is carried out for a period between about 1 and 5 hours.

4. The process of claim 1 wherein the heating of the admixture is carried out for a time sufficient to precipitate at least about 95 percent of the molybdenum contained in the organic solution.

5. The process of claim 1 wherein the residual organic solution remaining following separation of the precipitated molybdenum contains less than about 250 parts per million of molybdenum.

6. The process of claim 1 wherein the admixture is heated to a temperature in the range of between about 175° C. and 225° C.

7. The process of claim 1 wherein the amount of water admixed with the organic solution is between about 2.5 percent and 5 percent.

8. The process of claim 1 wherein said heating is conducted under a pressure of between about 100 p.s.i.g. and 600 p.s.i.g.

9. The process of claim 1 wherein the olefinically unsaturated compound is propylene and the organic hydroperoxide is tertiary butyl hydroperoxide.

10. The process of claim 9 wherein the amount of water admixed with the organic solution is between about 2.5 percent and 5 percent and the admixture is heated to a temperature in the range between about 175° C. and 225° C.

11. In the process for the recovery of molybdenum from a reaction mixture obtained from the epoxidation of an olefin with an organic hydroperoxide in the presence of a molybdenum compound catalyst wherein product epoxide and the alcohol corresponding to the hydroperoxide are removed from the reaction mixture leaving a spent catalyst solution containing between about 0.1 and 2 percent molybdenum, the improvement which comprises:
   (a) admixing said spent catalyst solution with water in an amount between about 0.5 and 10 percent, based on the weight of the solution;
   (b) heating the resultant admixture to a temperature in the range of about 150° C. and 250° C. under pressure sufficient to maintain said admixture in the liquid phase and for a time sufficient to precipitate at least about 95 percent of the molybdenum contained in the organic solution as a solid; and
   (c) separating the precipitated molybdenum containing solids from the organic solution.

12. The process of claim 11 wherein the olefin is propylene and the organic hydroperoxide is tertiary butyl hydroperoxide.

13. The process of claim 12 wherein the amount of water admixed with the spent catalyst solution is between about 2.5 percent and 5 percent and the admixture is heated at a temperature in the range between about 175° C. and 225° C. until a pressure of between about 100 p.s.i.g. and 600 p.s.i.g.

14. The process of claim 13 wherein the residual organic solution remaining following separation of the precipitated molybdenum contains less than about 100 parts per million of molybdenum.

15. A process for separating molybdenum values contained in residual organic effluents from epoxidation of olefins with hydroperoxides, said process comprising:
(1) Combining the molybdenum containing effluent with from about 1% to about 10%, by weight, water;
(2) Heating the effluent and water mixture to a temperature of from about 150° C. to about 250° C. at a pressure from about 100 p.s.i.g. to about 600 p.s.i.g.; and
(3) Separating the solid phase.

16. A process according to claim 15, in which the mixture of effluent and water is heated for about 0.5 to about 10 hours at between 150° C. and 250° C. with continuous agitation.

17. A process according to claim 16, in which the mixture of effluent and water is heated for from about 0.5 to about 10 hours at between 150° C. and 250° C. with continuous agitation.

18. A process according to claim 15, 16 or 17, in which the mixture is heated from about 150° C. to about 250° C. under a pressure of from about 300 p.s.i.g. to about 500 p.s.i.g.

19. A process according to claim 15, 16 or 17, in which the mixture is heated from about 150° C. to about 250° C. under a pressure of from about 100 p.s.i.g. to about 500 p.s.i.g.

* * * * *

UNITED STATES PATENT AND TRADEMARK OFFICE
CERTIFICATE OF CORRECTION

PATENT NO. : 4,485,074
DATED : November 27, 1984
INVENTOR(S) : Richard B. Poenisch It is certified that error appears in the above-identified patent and that said Letters Patent are hereby corrected as shown below:

In claim 1, col. 8, line 1, after the word "unsaturated" insert --compound with an organic hydroperoxide and--

Signed and Sealed this

Thirtieth Day of April 1985

[SEAL]

Attest:

DONALD J. QUIGG

Attesting Officer    Acting Commissioner of Patents and Trademarks